United States Patent
Park et al.

(10) Patent No.: US 9,294,957 B2
(45) Date of Patent: Mar. 22, 2016

(54) METHOD AND APPARATUS FOR RESOURCE ALLOCATION BASED ON BUFFER STATUS INFORMATION OF NEIGHBORING CELL

(71) Applicant: Electronics and Telecommunications Research Institute, Daejeon (KR)

(72) Inventors: Do Hyun Park, Daegu (KR); Woo Goo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 148 days.

(21) Appl. No.: 14/102,151

(22) Filed: Dec. 10, 2013

(65) Prior Publication Data

US 2014/0161106 A1 Jun. 12, 2014

(30) Foreign Application Priority Data

Dec. 11, 2012 (KR) .......................... 10-2012-0143423

(51) Int. Cl.
*H04W 28/02* (2009.01)
*H04L 5/00* (2006.01)
*H04W 72/12* (2009.01)

(52) U.S. Cl.
CPC ......... *H04W 28/0278* (2013.01); *H04L 5/0073* (2013.01); *H04W 72/1284* (2013.01)

(58) Field of Classification Search
None
See application file for complete search history.

(56) References Cited

U.S. PATENT DOCUMENTS

| | | | |
|---|---|---|---|
| 2007/0042784 A1 | 2/2007 | Anderson | |
| 2010/0254344 A1* | 10/2010 | Wei et al. | 370/330 |
| 2011/0105139 A1* | 5/2011 | On | 455/453 |
| 2014/0126399 A1* | 5/2014 | Damnjanovic et al. | 370/252 |
| 2015/0009923 A1* | 1/2015 | Lei et al. | 370/329 |

FOREIGN PATENT DOCUMENTS

KR 10-2012-0097907 9/2012

* cited by examiner

*Primary Examiner* — Gary Mui
(74) *Attorney, Agent, or Firm* — Nelson Mullins Riley & Scarborough LLP; Anthony A. Laurentano; Lewis Lee

(57) ABSTRACT

Disclosed is a method and apparatus for resource allocation based on a buffer status in a neighboring cell. A method of allocating a resource between base stations may include receiving, by a first base station, information associated with a buffer status of a second base station, comparing information associated with a buffer status of the first base station to the information associated with the buffer status of the second base station, and relatively allocating a resource based on a result of the comparison.

20 Claims, 8 Drawing Sheets

METHOD AND APPARATUS FOR RESOURCE ALLOCATION BASED ON BUFFER STATUS INFORMATION OF NEIGHBORING CELL

CROSS-REFERENCE TO RELATED APPLICATION

This application claims priority to and the benefit of Korean Patent Application No. 10-2012-0143423, filed on Dec. 11, 2012, in the Korean Intellectual Property Office, the disclosure of which is incorporated herein by reference.

BACKGROUND

1. Field of the Invention

Exemplary embodiments relate to a method and apparatus for resource allocation based on a buffer status in a neighboring cell that may allocate a resource using a buffer status of a neighboring cell in a wireless communication system.

2. Description of the Related Art

Base stations (BSs) in a wireless communication system measure interference with neighboring base stations, and manage interference by partitioning resources based on an area in which the interference is measured. In this instance, the measured interference information may be shared between the neighboring base stations.

Generally, base stations perform scheduling by referring to a buffer status report (BSR) of a terminal or a user equipment (UE) accessing a cell of each base station.

Reference may be made to Korean Patent Publication No. 10-2012-0097907, published on Sep. 5, 2012, titled "HARQ resource allocation method and apparatus and signal transmission method and apparatus using the same" in which a base station may allocate uplink or downlink radio resources to each terminal based on downlink data buffered in the base station and buffer status reports received from the terminals.

However, when viewed from a perspective of an entire network, this scheduling method has a drawback of inefficient resource use due to the presence of a base station with abundant resources and a base station deficient in resources.

Also, simply measuring interference in a particular area and scheduling based on a buffer status report received from a terminal in the corresponding area based on a result of the measurement is just a countermeasure after interference occurs in the corresponding area, and thus, a service of a degraded quality is provided to the terminal until the interference issue is resolved by the base station.

Accordingly, there is a demand for a method of allocating resources more efficiently from a perspective of an entire network and of dealing with interference more quickly and effectively.

SUMMARY

An aspect of the present invention provides a method and apparatus for resource allocation based on a buffer status of a neighboring cell that may allocate resources more efficiently from a perspective of an entire network.

Another aspect of the present invention also provides a method and apparatus for resource allocation based on a buffer status of a neighboring cell that may deal with interference more quickly and effectively.

According to an aspect of the present invention, there is provided a method of allocating a resource between base stations, the method including receiving, by a first base station, information associated with a buffer status of a second base station, comparing information associated with a buffer status of the first base station to the information associated with the buffer status of the second base station, and relatively allocating a resource based on a result of the comparison.

The method may further include, before the receiving, measuring interference between the first base station and the second base station, and requesting the information associated with the buffer status of the second base station from the second base station when the interference between the first base station and the second base station is measured.

The allocating may include allocating the resource based on the buffer status of the first base station when the interference is not measured.

The first base station and the second base station may correspond to a femtocell base station.

The second base station may correspond to a neighboring base station of the first base station.

The allocating may include relatively determining a shared resource to be used by the first base station among a resource being shared between the first base station and the second base station based on a ratio between a size of data accumulated in a buffer of the first base station and a size of data accumulated in a buffer of the second base station, and allocating the determined shared resource to a terminal located in an interference region.

The method may further include determining a signal transmission interval of the first base station based on a ratio of a size of data accumulated in a buffer of the first base station and a size of data accumulated in a buffer of the second base station, and transmitting a signal to a terminal accessing the first base station during the determined signal transmission interval.

The method may further include determining a transmission power of the first base station based on a ratio of a size of data accumulated in a buffer of the first base station and a size of data accumulated in a buffer of the second base station, and transmitting a signal to a terminal accessing the first base station with the determined transmission power.

According to another aspect of the present invention, there is provided an apparatus for resource allocation in a wireless communication system, the apparatus including a communication unit to receive information associated with a buffer status of a base station, a comparison unit to compare information associated with a buffer status of the apparatus for resource allocation to the information associated with the buffer status of the base station, and an allocation unit to relatively allocate a resource based on a result of the comparison.

According to still another aspect of the present invention, there is provided an apparatus for resource allocation in a wireless communication system, the apparatus including a comparison unit to compare information associated with a buffer status of the apparatus for resource allocation to information associated with a buffer status received from a base station, and an allocation unit to relatively allocate a resource based on a result of the comparison.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Hereinafter, exemplary embodiments are described in detail by referring to the accompanying drawings.

Figure 1:
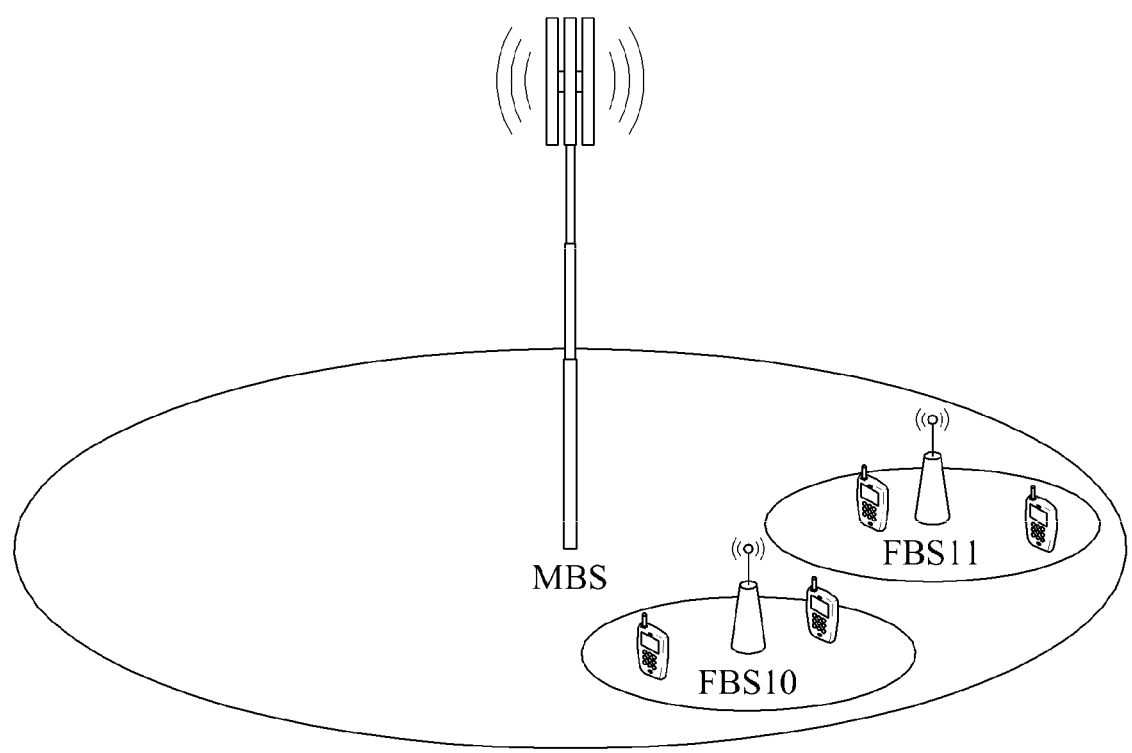
FIG. 1 is a diagram illustrating an example of a macrocell and a femtocell in a hierarchical network.

FIG. 1 is a diagram illustrating an example of a macrocell and a femtocell in a hierarchical network. Hereinafter, a situation in a femtocell base station is described as an example.

Within one macrocell base station (MSB), a plurality of femtocell base stations (FBSs), here, FBS10 and FBS11, may be present. The femtocell base station FBS10 and FBS11 is a combination of a word "femto" representing one quadrillionth and a word "cell" representing a minimum unit of a service zone served by one mobile communication base station, and refers to an ultra-small base station that provides a service to a smaller limited coverage area than a conventional base station, such as, for example, a home or an office.

However, as shown in FIG. 1, when the femtocell base stations FBS10 and FBS11 are located adjacent to one another, interference between the femtocell base stations FBS10 and FBS11 may occur. In this case, a service quality of a terminal or a user equipment (UE) in an interference region may be degraded.

To minimize the interference, the femtocell base stations FBS10 and FBS11 may measure interference between the femtocell base stations FBS10 and FBS11 adjacent to one another, and may allocate resources to terminals accessing femtocells of the femtocell base stations FBS10 and FBS11 by referring to buffer status reports (BSRs) received from the corresponding terminals. In this instance, the resources of the femtocell base stations FBS10 and FBS11 may include a shared resource used for interference management.

Figure 2:
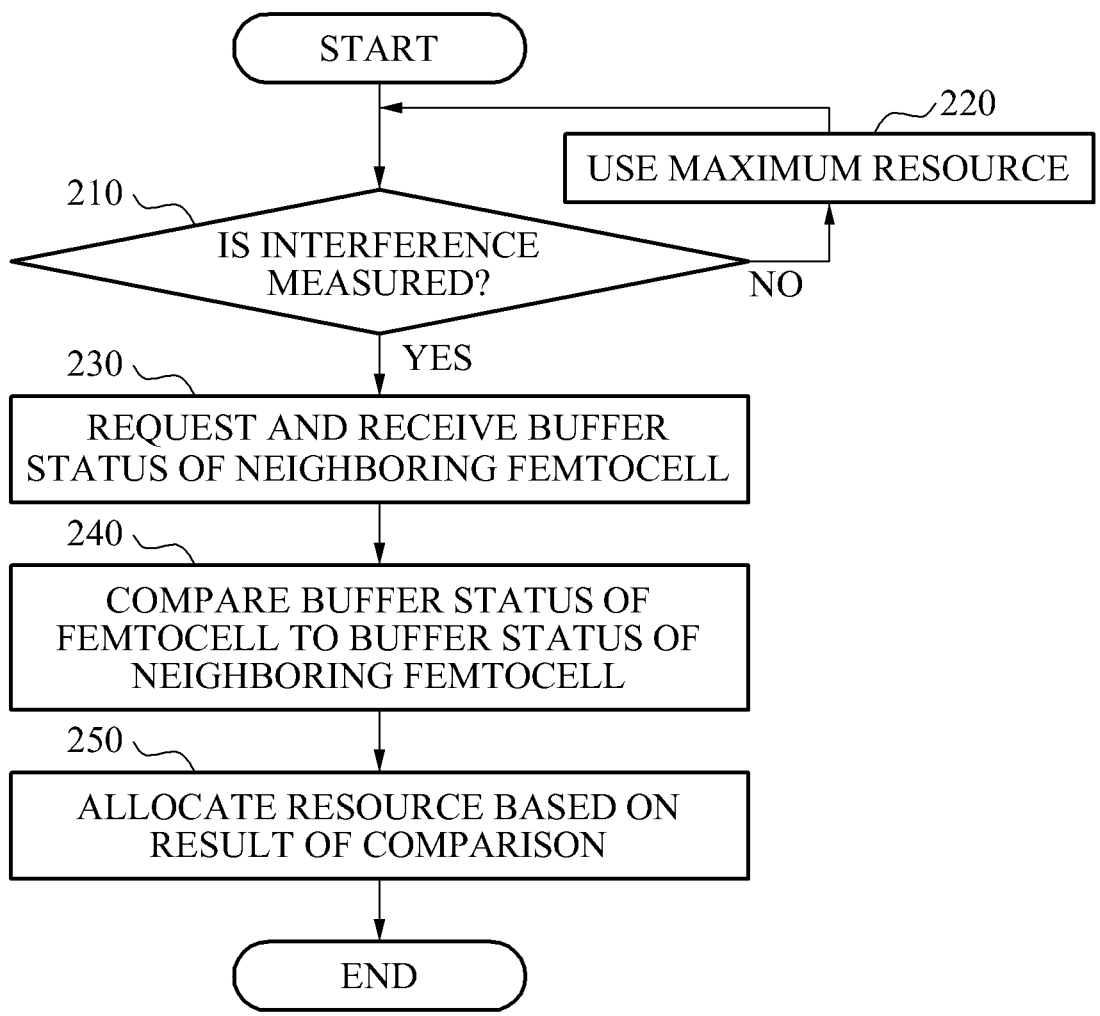
FIG. 2 is a flowchart illustrating a method for resource allocation between base stations based on a buffer status of a neighboring cell according to an exemplary embodiment.
Figure 3:
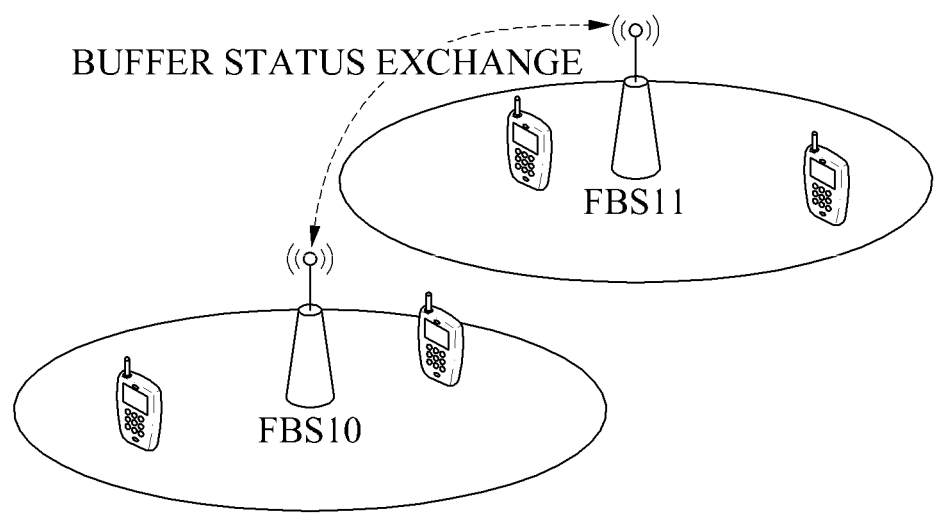
FIG. 3 is a diagram illustrating an example of a base station exchanging information associated with a buffer status of the base station with a neighboring base station according to an exemplary embodiment.

FIG. 2 is a flowchart illustrating a method for resource allocation between base stations based on a buffer status of a neighboring cell according to an exemplary embodiment. FIG. 3 is a diagram illustrating an example of a base station exchanging information associated with a buffer status of the base station with a neighboring base station according to an exemplary embodiment. Hereinafter, a method for resource allocation according to an exemplary embodiment is described with reference to FIGS. 2 and 3.

First, as shown in FIG. 2, a base station, for example, a first base station, may measure interference with a neighboring base station, for example, a second base station in operation 210. Here, the first base station and the second base station may correspond to a femtocell base station.

When interference is determined to be absent as a result of the measurement, the first base station may perform scheduling using a maximum resource of the first base station in operation 220. For example, when interference is not measured, the first base station may allocate a resource of the first base station or a resource being shared with the neighboring base station to a terminal accessing a cell of the first base station by referring to a buffer status of the first base station, that is, a status in which data is accumulated in a buffer of the first base station and a buffer status report received from the corresponding terminal.

However, when interference is determined to be present as a result of the measurement, the first base station may request information associated with a buffer status of the second base station from the second base station and may receive the information associated with the buffer status from the second base station in operation 230. In this instance, as shown in FIG. 3, the first base station may conduct a buffer status exchange with the second base station.

The above interference measurement procedure is designed to determine whether the information associated with the buffer status of the neighboring base station is received from the neighboring base station, and may be omitted if necessary. In this case, the first base station may perform a subsequent procedure periodically or when a preset condition is satisfied, to request information associated with a buffer status of the neighboring base station from the neighboring base station.

After the first base station receives the information associated with the buffer status of the second base station from the second base station, the first base station may compare the information associated with the buffer status of the first base station to the information associated with the buffer status of the second base station in operation 240, and may perform scheduling based on a result of the comparison in operation 250.

Subsequently, when no interference is measured in the next interference measurement, the first base station may perform scheduling using the maximum resource of the first base station.

Figure 4:
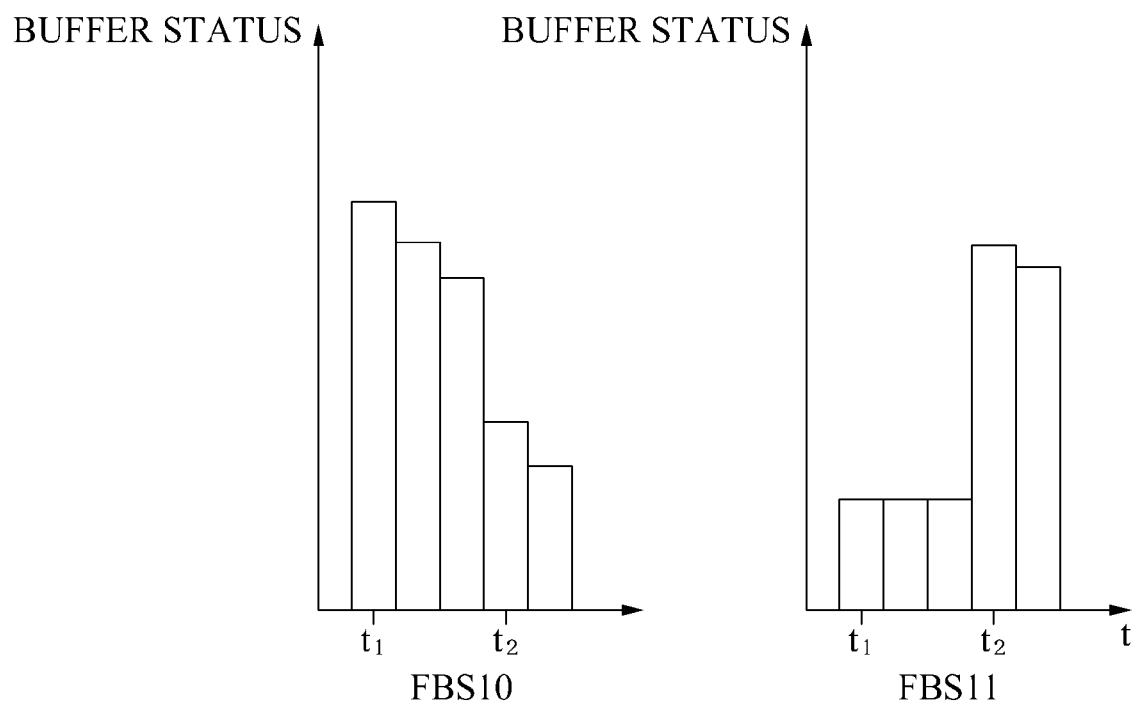
FIG. 4 is a diagram illustrating an example of buffer status of two neighboring base stations according to an exemplary embodiment.
Figure 5:
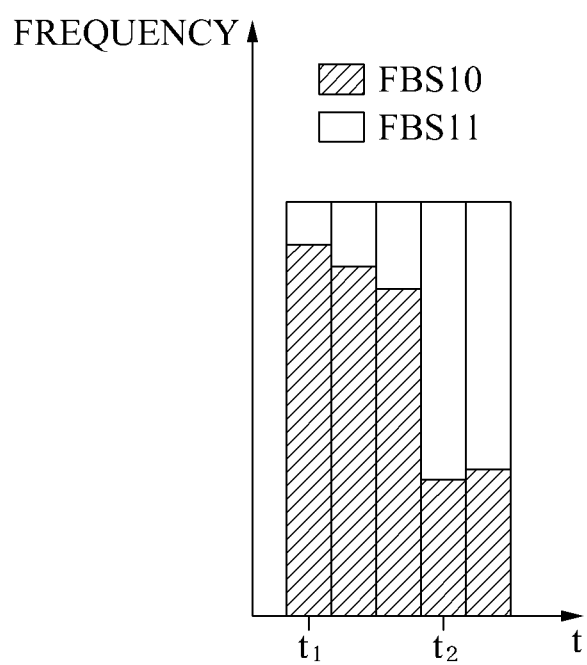
FIGS. 5 through 7 are diagrams illustrating a method of allocating resources shared between neighboring base stations according to an exemplary embodiment.
Figure 6:
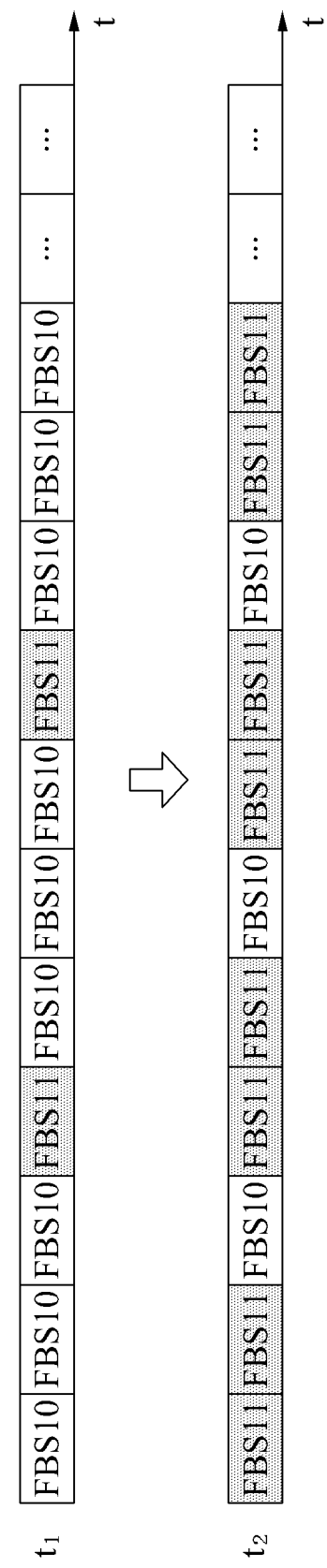
Figure 7:
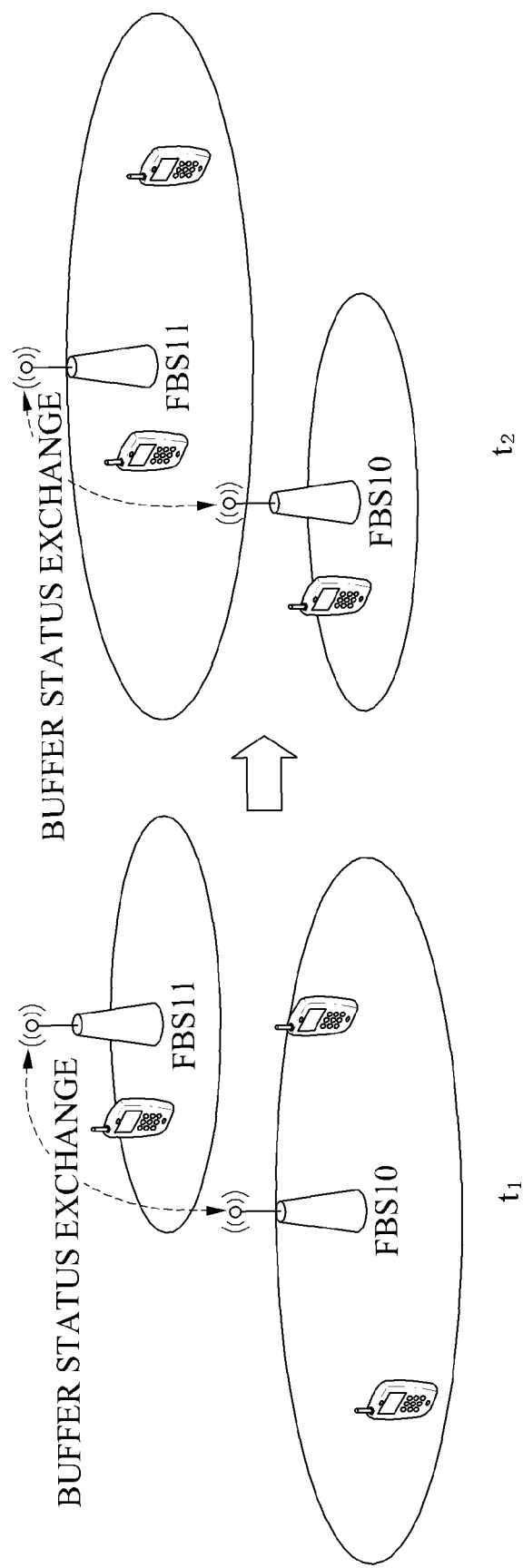

FIG. 4 is a diagram illustrating an example of buffer status of two neighboring base stations according to an exemplary embodiment. FIGS. 5 through 7 are diagrams illustrating a method of allocating resources shared between neighboring base stations according to an exemplary embodiment. Hereinafter, a process in which a base station receives information associated with a buffer status from a neighboring base station, assigns a shared resource dynamically, and allocates the resource to a terminal accessing a cell of the base station is described with reference to FIGS. 4 through 7.

First, referring to FIG. 4, buffer status of a first femtocell base station FBS10 and a second femtocell base station FBS11 over time t is shown.

The two femtocell base stations FBS10 and FBS11 may partition and use frequency resources therebetween based on information associated with buffer status as shown in FIG. 4, may divide and use resources on a time axis, or may adjust a transmission power. Hereinafter, each embodiment is described in more detail with reference to FIGS. 5 through 7.

First Embodiment

A case of partitioning and using a frequency resource is described as an example with reference to FIG. 5.

The first femtocell base station FBS10 may verify a buffer status of the first femtocell base station FBS10 and a buffer status of the neighboring femtocell base station FBS11, and when a resource required by the first femtocell base station FBS10 is greater than a resource required by the second femtocell base station FBS11 in an interference region, a resource greater than the resource of the second femtocell base station FBS11 among a shared resource between the first femtocell base station FBS10 and the second femtocell base station FBS11 may be used in an aspect of interference management.

For example, as shown in FIG. 4, a relatively larger amount of data may be accumulated in a buffer of the first femtocell base station FBS10 at an initial time $t_1$, and as time $t_2$ goes, a relatively larger amount of data may be accumulated in a buffer of the second femtocell base station FBS11. In this case, as shown in FIG. 5, the first femtocell base station FBS10 may relatively determine a shared resource to be used by the first femtocell base station FBS10, based on a ratio between a size of data accumulated in the buffer of the first femtocell base station FBS10 and a size of data accumulated in the buffer of the second femtocell base station FBS11. The first femtocell base station FBS10 may allocate the determined shared resource to terminals located in the interference region. Accordingly, the first femtocell base station FBS10 may provide a service smoothly to the terminals accessing a femtocell of the first femtocell base station FBS10.

In FIG. 5, for example, a larger amount of resources is illustrated as being allocated to the first femtocell base station FBS10 since an amount of data accumulated in the buffer of the first femtocell base station FBS10 is larger than that of the second femtocell base station FBS11 during $t_1$. However, a larger amount of resources may be allocated to the second femtocell base station FBS11 rather than the first femtocell base station FBS10 during $t_2$ since an amount of data accumulated in the buffer of the first femtocell base station FBS10 is smaller than that of the second femtocell base station FBS11 during $t_2$.

Second Embodiment

A case of dividing and using a resource on a time axis is described as an example with reference to FIG. 6.

This may be designed to determine a signal transmission interval used for interference management based on the buffer status of the first femtocell base station FBS10 and the buffer status of the second femtocell base station FBS11 and to transmit a signal only for the determined interval, to prevent interference and achieve efficient resource allocation.

For example, as shown in FIG. 4, when an amount of data accumulated in the buffer of the first femtocell base station FBS10 is larger three times than that of the second femtocell base station FBS11 during $t_1$, a signal transmission interval for the first femtocell base station FBS10 and a signal transmission interval for the second femtocell base station FBS11 may be allocated at 3:1 as shown in FIG. 6.

In contrast, a signal transmission interval allocated for the second femtocell base station FBS11 may be twice as much as that of the first femtocell base station FBS10 during $t_2$ since an amount of data accumulated in the buffer of the second femtocell base station FBS11 is larger twice than that of the first femtocell base station FBS10 during $t_2$. Accordingly, each of the femtocell base stations FBS10 and FBS11 may mitigate service quality degradation caused by lack of resources that may occur in a terminal.

Third Embodiment

A case of adjusting a transmission power is described as an example with reference to FIG. 7.

As power of a signal transmitted from a base station increases, a delay caused due to hybrid automatic repeat request (HARM) retransmission may be reduced. Accordingly, the higher transmission power of the base station is, data accumulated in a buffer of the corresponding base station may be processed more quickly.

For example, when an amount of data accumulated in the buffer of the first femtocell base station FBS10 is larger three times than that of the second femtocell base station FBS11 during $t_1$ as shown in FIG. 4, a transmission power level of the first femtocell base station FBS10 may be determined to be relatively higher than that of the second femtocell base station FBS11 as shown in FIG. 7.

In contrast, the transmission power of the second femtocell base station FBS11 may be relatively reduced and the transmission power of the first femtocell base station FBS10 may be relatively increased during $t_2$ since an amount of data accumulated in the buffer of second femtocell base station FBS11 is larger than an amount of data accumulated in the buffer of the first femtocell base station FBS10 during $t_2$.

In this case, interference from a femtocell base station transmitting a signal having a relatively higher signal intensity may be increased and performance degradation of a femtocell base station transmitting a signal having a relatively lower signal intensity may occur. However, these issues may be resolved through signaling transmitted and received between each base station of the network.

Figure 8:
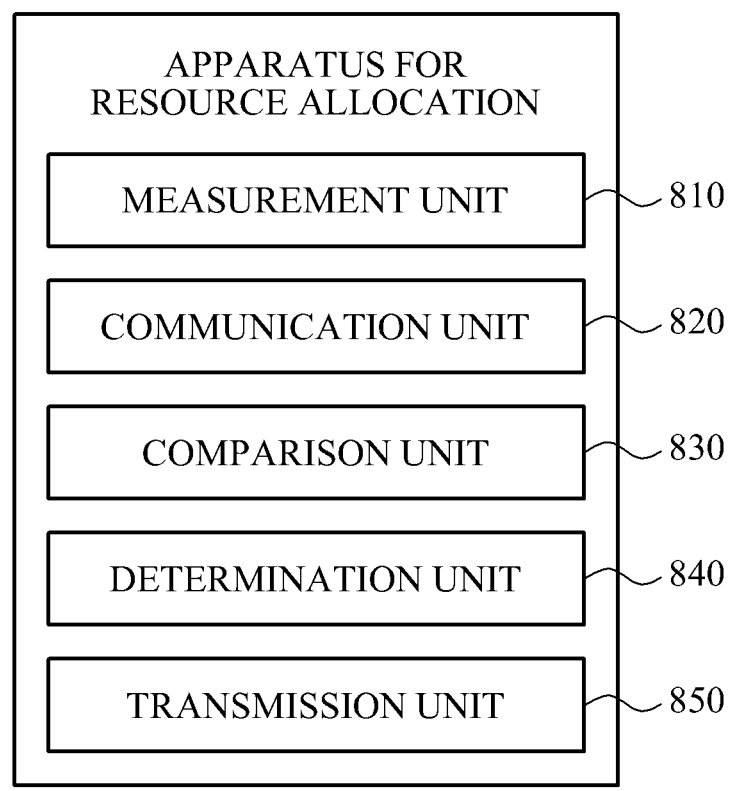
FIG. 8 is a block diagram illustrating an apparatus for resource allocation that allocates shared resources based on a buffer status of a neighboring cell according to an exemplary embodiment.

FIG. 8 is a block diagram illustrating an apparatus for resource allocation according to an exemplary embodiment. Hereinafter, the apparatus for resource allocation according to an exemplary embodiment is described with reference to FIG. 8.

As shown in FIG. 8, the apparatus 800 for resource allocation according to an exemplary embodiment may include a measurement unit 810, a communication unit 820, a comparison unit 830, a determination unit 840, and a transmission unit 850, to enable resource allocation in a wireless communication system. The apparatus 800 for resource allocation according to an exemplary embodiment may be implemented as a femtocell base station.

The measurement unit 810 may measure interference with a neighboring base station to determine whether information associated with a buffer status of the neighboring base station is received from the neighboring base station. The measurement unit 810 may receive the information associated with the buffer status of the neighboring base station periodically or when a predetermined condition is satisfied, and may not be included in the apparatus 800 for resource allocation.

The communication unit 820 may receive the information associated with the buffer status of the neighboring base station. For example, when interference with the neighboring base station is measured by the measurement unit 810, the communication unit 820 may request the information associated with the buffer status of the neighboring base station from the neighboring base station, and in response to the request, may receive the information associated with the buffer status of the neighboring base station.

The comparison unit 830 may compare the information associated with the buffer status of the apparatus 800 for resource allocation to the information associated with the buffer status of the neighboring base station received by the communication unit 820.

The determination unit 840 may relatively determine a shared resource to be used by the apparatus 800 for resource allocation among a resource being shared with the neighboring base station, based on a ratio between a size of data accumulated in a buffer of the apparatus 800 for resource allocation and a size of data accumulated in a buffer of the neighboring base station as described through FIG. 5.

In this case, an allocation unit may allocate the shared resource determined by the determination unit 840 to a terminal located in an interference region based on a result of the comparison by the comparison unit 830.

When interference is determined to be absent by the measurement unit 810, the allocation unit may allocate a resource based on the buffer status of the apparatus 800 for resource allocation.

Also, the determination unit 840 may determine a signal transmission interval based on the ratio between the size of data accumulated in the buffer of the apparatus 800 for resource allocation and the size of data accumulated in the buffer of the neighboring base station as described through FIG. 6. In this case, the transmission unit 850 may transmit a signal during the signal transmission interval determined by the determination unit 840.

Also, as described through FIG. 7, the determination unit 840 may determine transmission power based on the ratio between the size of data accumulated in the buffer of the apparatus 800 for resource allocation and the size of data accumulated in the buffer of the neighboring base station. In this case, the transmission unit 850 may transmit a signal with the transmission power determined by the determination unit 840.

The apparatus for resource allocation according to an exemplary embodiment may be implemented as a scheduler to achieve dynamic resource allocation mutually by adding a function for verifying a buffer status of a neighboring femtocell base station to a conventional femtocell base station and comparing the buffer statuses.

In this case, the scheduler may include a comparison unit to compare information associated with a buffer status of the apparatus for resource allocation to information associated with a buffer status received from the base station, and an allocation unit to relatively allocate a resource based on a result of the comparison.

Also, the scheduler may further include a determination unit to relatively determine a shared resource to be used by the apparatus for resource allocation among a resource being shared with the corresponding base station, based on a ratio between a size of data accumulated in a buffer of the apparatus for resource allocation and a size of data accumulated in a buffer of the neighboring femtocell base station. In this case, the allocation unit may allocate the shared resource determined by the determination unit to a terminal located in an interference region.

In this instance, the determination may determine at least one of a signal transmission interval and transmission power based on the ratio between the size of data accumulated in the buffer of the apparatus for resource allocation and the size of data accumulated in the buffer of the neighboring femtocell base station.

Accordingly, the method and apparatus for resource allocation according to an exemplary embodiment may optimize a network through a buffer status as well as an interference signal of a neighboring cell, and may provide a more efficient network operation.

According to the exemplary embodiments, more efficient resource use may be achieved from a perspective of an entire network and more efficient allocation of resources to terminals located in an interference region may be enabled, by verifying a buffer status of a neighboring base station and by allocating resources being shared between base stations or changing a signal transmission interval or a transmission power.

Because resources are allocated by verifying a buffer status of each base station and estimating interference in advance, interference may be dealt with more quickly and effectively and a service may be provided smoothly to a terminal.

The apparatus for resource allocation described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums.

The methods described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of allocating a resource between base stations, the method comprising:
   requesting, by a first base station, information associated with a buffer status of a second base station from the second base station when an interference between the first base station and the second base station is measured;
   receiving, by the first base station, the information associated with the buffer status of the second base station;
   comparing information associated with a buffer status of the first base station to the information associated with the buffer status of the second base station; and
   relatively allocating a resource based on a result of the comparison.

2. The method of claim 1, further comprising:
   before the receiving,
   measuring interference between the first base station and the second base station.

3. The method of claim 2, wherein the allocating comprises allocating the resource based on the buffer status of the first base station when the interference is not measured.

4. The method of claim 1, wherein the first base station and the second base station correspond to a femtocell base station.

5. The method of claim 1, wherein the second base station corresponds to a neighboring base station of the first base station.

6. The method of claim 1, wherein the allocating comprises:
   relatively determining a shared resource to be used by the first base station among a resource being shared between the first base station and the second base station based on a ratio between a size of data accumulated in a buffer of the first base station and a size of data accumulated in a buffer of the second base station; and
   allocating the determined shared resource to a terminal located in an interference region.

7. The method of claim 1, further comprising:
   determining a signal transmission interval of the first base station based on a ratio of a size of data accumulated in a buffer of the first base station and a size of data accumulated in a buffer of the second base station; and
   transmitting a signal to a terminal accessing the first base station during the determined signal transmission interval.

8. The method of claim 1, further comprising:
   determining a transmission power of the first base station based on a ratio of a size of data accumulated in a buffer of the first base station and a size of data accumulated in a buffer of the second base station; and
   transmitting a signal to a terminal accessing the first base station with the determined transmission power.

9. An apparatus for resource allocation in a wireless communication system, the apparatus comprising:
   a communication unit to receive information associated with a buffer status of a base station;
   a comparison unit to compare information associated with a buffer status of the apparatus for resource allocation to the information associated with the buffer status of the base station; and
   an allocation unit to relatively allocate a resource based on a result of the comparison,
   wherein the communication unit requests the information associated with the buffer status of the base station from the base station when the interference with the base station is measured.

10. The apparatus of claim 9, further comprising:
    a measurement unit to measure interference with the base station.

11. The apparatus of claim 10, wherein the allocation unit allocates the resource based on the buffer status of the apparatus for resource allocation when the interference is not measured.

12. The apparatus of claim 9, wherein the base station corresponds to a femtocell base station.

13. The apparatus of claim 9, wherein the base station corresponds to a base station adjacent to the apparatus for resource allocation.

14. The apparatus of claim 9, further comprising:
    a determination unit to relatively determine a shared resource to be used by the apparatus for resource allocation among a resource being shared with the base station based on a ratio between a size of data accumulated in a buffer of the apparatus for resource allocation and a size of data accumulated in a buffer of the base station, and
    wherein the allocation unit allocates the determined shared resource to a terminal located in an interference region.

15. The apparatus of claim 9, further comprising:
    a determination unit to determine a signal transmission interval based on a ratio between a size of data accumulated in a buffer of the apparatus for resource allocation and a size of data accumulated in a buffer of the base station; and
    a transmission unit to transmit a signal during the determined signal transmission interval.

16. The apparatus of claim 9, further comprising:
    a determination unit to determine a transmission power based on a ratio between a size of data accumulated in a buffer of the apparatus for resource allocation and a size of data accumulated in a buffer of the base station; and
    a transmission unit to transmit a signal with the determined transmission power.

17. An apparatus for resource allocation in a wireless communication system, the apparatus comprising:
    a comparison unit to compare information associated with a buffer status of the apparatus for resource allocation to information associated with a buffer status received from a base station; and
    an allocation unit to relatively allocate a resource based on a result of the comparison,
    wherein the information associated with the buffer status received from the base station is requested when an interference with the base station is measured.

18. The apparatus of claim 17, wherein the base station corresponds to a femtocell base station adjacent to the apparatus for resource allocation.

19. The apparatus of claim 17, further comprising:
    a determination unit to relatively determine a shared resource to be used by the apparatus for resource allocation among a resource being shared with the base station based on a ratio between a size of data accumulated in a buffer of the apparatus for resource allocation and a size of data accumulated in a buffer of the base station, and
    wherein the allocation unit allocates the determined shared resource to a terminal located in an interference region.

20. The apparatus of claim 17, further comprising:
a determination unit to determine at least one of a signal transmission interval and transmission power based on a ratio between a size of data accumulated in a buffer of the apparatus for resource allocation and a size of data accumulated in a buffer of the base station.

* * * * *